United States Patent

Bush et al.

[11] Patent Number: 5,206,200
[45] Date of Patent: Apr. 27, 1993

[54] TIN CATALYSTS FOR HYDROLYSIS OF LATENT AMINE CURING AGENTS

[75] Inventors: Richard W. Bush, Columbia; Euegene E. Carney, Sykesville, both of Md.

[73] Assignee: W. R. Grace & Co.-Conn., New York, N.Y.

[21] Appl. No.: 689,385

[22] Filed: Apr. 22, 1991

[51] Int. Cl.$^5$ .............................................. B01J 31/12
[52] U.S. Cl. ..................................... 502/167; 502/170
[58] Field of Search ............................... 502/167, 170

[56] References Cited

U.S. PATENT DOCUMENTS

| | | | |
|---|---|---|---|
| 3,397,158 | 8/1968 | Britain et al. | 521/126 |
| 4,454,253 | 6/1984 | Murphy et al. | 264/46.9 |
| 4,513,112 | 4/1985 | Ernst et al. | 524/590 |
| 4,616,066 | 10/1986 | Tominaga | 525/109 |
| 4,711,944 | 12/1987 | Sherwin et al. | 526/318.42 |
| 4,713,481 | 12/1987 | Tortorello et al. | 560/159 |
| 4,816,542 | 3/1989 | Liebl et al. | 528/59 |
| 4,861,832 | 8/1989 | Walsh | 525/113 |

Primary Examiner—Patrick P. Garvin
Assistant Examiner—Brent M. Peebles
Attorney, Agent, or Firm—Valerie E. Looper

[57] ABSTRACT

A tin catalyst constituting an organotin compound modified with an amine is used to catalyze the hydrolysis of latent amine curing agents in amine-curable polymeric compositions. The tin catalyst is formed from the reaction product of a stannous alkanoate and an amine, optionally in the form of an adduct with water. A preferred catalyst is the reaction product of stannous octoate and ethylenediamine.

9 Claims, No Drawings

TIN CATALYSTS FOR HYDROLYSIS OF LATENT AMINE CURING AGENTS

BACKGROUND OF THE INVENTION

This invention relates to tin compounds useful as catalysts. More specifically, the invention relates to amine-modified tin compounds which can catalyze the hydrolysis of latent amine curing agents for a wide variety of amine curable monomers and prepolymers useful as adhesives, sealants and coatings.

Many monomers and prepolymers can be cured or cross-linked by amines. Examples of such amine-curable materials include the various acrylates, epoxides, urethanes, anhydrides and the like. Formulations of these curable materials are often made up as one component systems in which the monomer or prepolymer is admixed with the amine curing agent. To provide for adequate shelf life, the curing agent must be in a deactivated or latent form until the formulation is ready for use. The curing agent is then activated via exposure to moisture which causes a hydrolysis reaction to take place to thereby regenerate the amine. A representative example of this process is the moisture induced hydrolysis of a ketimine to form the corresponding amine and ketone ($R^1$, $R^2$ and $R^3$ representing well known substituent groups):

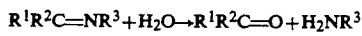

$$R^1R^2C{=}NR^3 + H_2O \rightarrow R^1R^2C{=}O + H_2NR^3$$

The regeneration of the amine by hydrolysis is not instantaneous, however, and since the rate of cure is a function of available amine curing agent, the cure time is dependent on the rate of hydrolysis.

For many applications, it is highly desirable to have a rapid initial or partial moisture cure to provide "green strength". Green strength results from polymerization occurring at ambient temperatures, and an adhesive or sealant with high green strength has high initial adhesion or tack. Furthermore, sufficient green strength will hold an adhesive bond in place during subsequent processing and final curing stages.

The prior art discloses generally the use of tin compounds in polymerizations employing amine-based curing agents, but does not teach the use of such compounds to catalyze hydrolysis reactions. U.S. Pat. No. 4,616,066 discloses in Col. 8, line 5, the use of dibutyltin dilaurate (DBTDL) in a polymer system which includes an epoxy resin and a ketimine made into an aqueous emulsion for electrodeposition. However, the DBTDL serves not as a hydrolysis catalyst for the ketimine, but rather as a curing agent in the later baking step. U.S. Pat. No. 4,713,481 discloses in Col. 7, line 29, the use of DBTDL in a polymerization process which includes the reaction of a ketone-blocked ethylenediamine and an isocyanate-terminated polyurethane. The DBTDL is used to catalyze formation of the polyurethane.

U.S. Pat. No. 4,711,944 relates to humidity resistant coatings of copolymers of t-butyl acrylate and polyepoxides. In Col. 5, line 50, there is disclosed the use of stannous octoate or DBTDL as a catalyst for the reaction of epoxy groups to crosslink hydroxyl, carboxyl or amide functions on the polyacrylate. The stannous octoate and DBTDL are not used as hydrolysis catalysts for latent amines.

The prior art has disclosed non-tin based compounds for accelerating moisture cure. In U.S. Pat. No. 4,861,832, amines are listed in Col. 5, lines 20-30 as co-curing agents in a reaction involving epoxy resin and a ketimine. Acids are also known as hydrolysis catalysts for latent amines as taught by U.S. Pat. No. 4,816,542 at Col. 3, lines 53-55, where they catalyze the cure of polyurethane prepolymers.

Thus, while the prior art recognizes the need for catalysis of various reactions involving the moisture curing of monomers and prepolymers, there has heretofore been no use of a tin catalyst for such application.

SUMMARY OF THE INVENTION

It is accordingly an object of the invention to provide a tin catalyst for increasing the rate of cure of monomers and prepolymers which are cured via a latent amine curing agent.

It is another object of the invention to provide a tin catalyst, as above, which increases the rate of cure by increasing the rate of hydrolysis of the latent amine.

It is yet another object of the invention to provide a method for curing an amine-curable polymer using the tin catalyst of the invention.

A further object of the invention is to provide a polymeric composition which includes an amine-curable polymer, a latent amine curing agent and the tin catalyst of the invention.

These objects are achieved by a method for moisture-induced hydrolysis of a latent amine curing agent in an amine-curable polymeric composition, in which the curing agent is combined with a catalytically effective amount of an organotin compound. The organotin compound is formed from the reaction of a stannous alkanoate having from 2 to 20 carbon atoms and an amine-containing compound. The curing agent is hydrolyzed in the presence of the organotin compound. Optionally, the organotin compound is in the form of a water adduct.

The objects of the invention are also achieved by a catalyst which comprises the organotin compound and by a method for curing an amine-curable polymer. In the latter method, the polymer is combined with a latent amine curing agent and a catalytically effective amount of the organotin compound of the invention. The polymer is then cured by cross-linking with the curing agent after the latter has been subjected to a moisture-induced hydrolysis which liberates the amine. The presence of the organotin compound increases the rate of hydrolysis of the latent amine.

The objects of the invention are also achieved by a polymeric composition which includes an amine-curable polymer, a latent amine curing agent and the organotin compound of the invention.

DETAILED DESCRIPTION OF THE PREFERRED EMBODIMENTS

The organotin compounds of the invention are amine-modified salts of stannous alkanoates. In general, the stannous salts are salts of carboxylic acids having from 2 to 20 carbon atoms, preferably from 6 to 10 carbon atoms, with stannous octoate being highly preferred. In general, the amine reacted with the stannous alkanoate is a mono- or polyfunctional amine which optionally includes ether groups.

Illustrative of mono- and polyfunctional amines useful in preparing the catalyst include ethylenediamine, triethylenetetraamine, diethylenetriamine, epoxy adducts of triethylenetetraamine, epoxy adducts of ethylenediamine, epoxy adducts of diethylenetriamine, 1,3-diaminopropane, 1,4-diaminobutane, hexanediamine, 4,9-dioxadodecane-1,12-diamine, 4,4'-diaminodicyclohexylmethane, 9-aminomethylstearylamine, polybutadiene diamine, m-phenylenediamine, tris(aminoethyl)amine, 2-methylpentamethylenediamine, bis-aminopropylpiperazine, diethylenetriamine, 3-(diethylamino)propylamine, piperazine, butylamine, dimethylaminoethanol, dodecylamine, triethylamine, and amine-terminated polybutadiene.

The amine-terminated polybutadiene preferably has a molecular weight of from about 500 to about 5000, most preferably between about 1000 and 3000.

A preferred example of the catalyst is the reaction product of stannous octoate and ethylenediamine.

The ratio of stannous alkanoate to amine in the catalyst can vary. In general, the ratio of moles of stannous alkanoate to equivalents of amino groups varies from about 1:8 to about 8:1. The catalyst can also be prepared as an adduct of a stannous alkanoate, an amine and water. Use of the water-containing adduct further increases the rate of hydrolysis.

The latent curing agents which are catalyzed by the tin catalysts of the invention include the various ketimines prepared by the reaction of ketones and primary mono- and polyfunctional amines with the withdrawal of water formed by, for example, azeotropic distillation.

Illustrative of suitable amines for preparing the ketimines are triethylenetetraamine, diethylenetriamine, ethylenediamine, 1,3-diaminopropane, 1,4-diaminodiaminobutane, 1,6-diaminohexane, 1,3-diaminopropane, 1,4-diaminobutane, 1,6-diaminohexane, 4,9-dioxadodecane, 1,12-diamine, and 4,4'-diaminodicyclohexylmethane. A particularly preferred group of amines are tris(aminoalkyl) amines and dialkylenetriamines, which are reacted with diisopropyl ketone as explained hereinbelow.

Other suitable amines for preparing the ketimines include the polymeric polyamines having molecular weights ranging up to about 5000. Examples of such polyamines are diamines which can be prepared by reductive cyanoethylation of polyols, such as polytetrahydrofuran. Products of this type contain terminal primary amino groups in the form of aminopropoxy groups. Other polyamines include polyoxypropylene diamine and amine-terminated polybutadiene and poly(butadiene/acrylonitrile).

Ketones reactable with the above amines to provide the ketimines are those which, apart from the keto group, contain no groups which react with a primary amino group. Illustrative of suitable ketones are acetone, methyl ethyl ketone, methyl propyl ketone, methyl isopropyl ketone, methyl isobutyl ketone, methyl isoamyl ketone, methyl amyl ketone, diethyl ketone, dipropyl ketone and cyclohexanone. Particularly preferred is diisopropyl ketone.

Other latent curing agents which can be catalyzed by the tin compounds of the invention include aldimines, enamines (prepared by the reaction of primary and secondary alkanolamines with aldehydes or ketones) and oxazolidines.

The preparation of ketimines is done by reacting compounds having primary amino groups with aliphatic or cyclic ketones. The reaction may optionally be catalyzed with acid. Typically the mixture is heated at reflux and the water of reaction and the excess carbonyl compound are removed by azeotropic distillation.

In a preferred embodiment, the latent amine curing agent is a tri- or tetraketimine formed using diisopropyl ketone (DIPK). The use of these specific higher functional ketimines results in a cure that proceeds more rapidly compared to formulations with diketimines. In addition, these specific tri- and tetrafunctional ketimines are more stable than other ketimines not based on DIPK.

The preferred triketimines are the reaction product of a tris(aminoalkyl)amine with diisopropyl ketone (DIPK) in a 1:3 (stoichiometric) molar ratio. In general, the tris(aminoalkyl)amine contains between 3 and 15 carbon atoms.

A specific example of a tris(aminoalkyl)amine is tris(aminoethyl)amine (TREN). The reaction product using TREN is designated TREN(DIPK)$_3$.

Tetraketimines are formed in a two-step reaction, the first step being the reaction of a dialkylenetriamine with DIPK in a :1:2 (stoichiometric) molar ratio. Two of the molecules formed in this first step are then coupled by reaction of the secondary NH groups with a diacrylate, a diepoxide or a diisocyanate to form the tetraketimine. In general, the dialkylenetriamine contains between 2 and 10 carbon atoms.

A detailed discussion of the above triketimines and tetraketimines is given in copending and concurrently filed U.S. patent application Ser. No. 689,391 which is hereby incorporated by reference.

The monomers and prepolymers used in conjunction with the tin catalyst of the invention include any monomer or prepolymer curable by a latent amine curing agent. Such materials include inter alia the various well known polyurethanes, anhydrides, acrylates and epoxy compounds, the latter composed of one or more curable resins containing more than one 1,2-epoxy group per molecule.

The epoxy compounds suitable for use in the invention can be any monomeric or polymeric compound or mixture of compounds having an epoxy equivalent greater than one, that is, wherein the averaqe number of epoxy groups per molecule is greater than one.

Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol, 2,2-bis(4-hydroxy cyclohexyl)propane and polyalkylene glycols such as polypropylene glycol; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols, such as bisphenol A, 1,1-bis(4-hydroxyphenyl)ethane, 1,1-bis(4-methyl hydroxyphenyl)isobutane, 1,5-dihydroxynaphthalene, and novolak resins. Preferred epoxy compounds include higher molecular weight resins such as the chain-extended diglycidyl ether of bisphenol A, dimerized linoleic acid-extended bisphenol A diglycidyl ether, and polyether polyurethanes terminated with bisphenol A diglycidyl ether.

Suitable polyurethane prepolymers include isocyanate-functional urethanes prepared by reacting a polyol, polyether, hydroxyl-terminated polyester, polyester amide, polyamine, or other polyfunctional active hydrogen-containing compound with a diisocyanate or other polyisocyanate having up to eight functional isocyanate groups. Such reactants include polyhydroxy polyesters, polyhydroxy polyethers and polyisocyanates having two or three reactive isocyanate groups. Generally, any isocyanate-functional urethane known in the art can be employed in the practice of this invention, with such urethanes having a molecular weight of at least 500, particularly in the range of 1,000 to 10,000 being preferred.

Any of the polyisocyanates having at least two reactive isocyanate groups can be employed in forming isocyanate-functional urethanes suitable for use in conjunction with the tin catalyst of the invention. Such polyisocyanates include, without limitation, aliphatic polyisocyanates such as 1,6-hexamethylene diisocyanate, 1,8-octamethylene diisocyanate, 1,12dodecamethylene diisocyanate; 2,2,4-trimethyl-hexamethylene diisocyanate; and the like; 3,3'-diisocyanatodipropyl ether; 3-isocyanatomethyl-3,5,5'-trimethylcyclohexyl isocyanate; cyclopentalene-1,3diisocyanate; cyclohexylene-1,4-diisocyanate; methyl 2,6-diisocyanatocaprolate; bis-(2-isocyanatoethyl)fumarate; 4-methyl-1,3-diisocyanatocyclohexane; transvinylene diisocyanate and similar unsaturated polyisocyanates; 4,4'-methylene-bis-(cyclohexylisocyanate) and related polyisocyanates; methane diisocyanates; bis-(2isocyanatoethyl) carbonate and similar carbonate polyisocyanates; N,N',N''-tris-(6-isocyanatohexamethylene) biuret and related polyisocyanates; as well as other known polyisocyanates derived from aliphatic polyamines; aromatic polyisocyanates such as toluene diisocyanates; xylene diisocyanates; dianisidine diisocyanate; 4,4'-diphenymethane diisocyanate; 1-ethoxy-2,4-diisocyanatobenzene; 1-chlor 2,4-diisocyanatobenzene; tris(4-isocyanatophenyl) methane; naphthalene diisocyanate; 4,4'-diphenyl diisocyanate; phenylene diisocyanates; 3,3'-dimethyl-4,4'-biphenyl diisocyanate; p-isocyanatobenzoyl isocyanates; tetrachloro-1,3-phenylene diisocyanate, and the like.

Acrylates useful as amine curable materials include ethylene glycol diacrylate, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6-hexamethylene glycol diacrylate, 1,10decamethylene glycol diacrylate, trimethylolpropane triacrylate, pentaerythritol tetraacrylate, pentaerythritol triacrylate, and mixtures thereof.

Other well known amine curable monomers and prepolymers include the well known anhydride-functional compounds.

In a preferred embodiment, an epoxy is combined with an acrylate and the above-described tri- or tetraketimines to form an adhesive composition. The epoxy and acrylate can be separate prepolymers or both epoxy and acrylate functionalities can be formed on the same molecule. Such compounds are described in the aformentioned U.S. patent application Ser. No. 689,391.

The amount of tin catalyst used can vary from about 0.1% to about 5% by weight, desirably from about 0.5% to about 4% and preferably from about 1% to about 3% by weight of the total weight of latent amine and monomer and/or prepolymer in the formulation.

The following examples illustrate the invention. All percentages in the examples, and elsewhere in the specification, are by weight unless otherwise specified. The stannous octoate used was obtained from Air Products under the "T-9" trademark. The acronym EDA refers to ethylenediamine.

In the examples, an inclined groove device was used to measure the degree of cure. This device consists of a Teflon block machined to contain four grooves, each 10 cm long, 1 cm wide, and varying uniformly in depth from 0 to 10 mm. The moisturecurable adhesive is flowed into the groove, levelled, and the device placed in a cabinet of desired humidity for the desired time. The device is removed and the cured adhesive is peeled from the thin end until uncured adhesive is observed. The horizontal distance is divided by 10 to obtain the depth of cure.

EXAMPLE 1

Stannous octoate (1.684 g or 4.16 mmoles) was mixed with ethylenediamine (0.125 g or 2.08 mmoles) to give a viscous yellow-orange mixture. This mixture (0.2 g) was stirred at 70° C. into 9.8 g of a moisturecurable epoxy formulation (consisting of epoxy-terminated polyether urethane resin, epoxy resins, calcium silicate, fumed silica, and 6% of the bis-ketimine of hexanediamine and diisopropyl ketone. A portion of the resulting mixture was placed in a plastic beaker and exposed to the atmosphere (70–80% RH), and within one hour after formulation there was noticeable odor of diisopropyl ketone evolved. After 3 hours the surface of the sample had only slight surface tack. After 4 hours the sample could be peeled from the walls of the beaker without sticking, indicating a through-cure. A similarly prepared sample stored in dry desiccator for 8 hours showed only slight cure, proving that moisture is necessary.

EXAMPLE 2

Use of Stannous Octoate (with and without amine) as Catalyst, and Comparison Run Containing No Catalyst Three mixtures were prepared using the same epoxy formulation as in Example 1 but varying the catalyst, and exposed to atmospheric moisture (70–80% RH):

| Sample No. | (1) (Comparison) | (2) | (3) |
| --- | --- | --- | --- |
| Epoxy formulation, grams | 10.0 | 9.8 | 9.8 |
| Stannous octoate, grams | — | 0.2 | — |
| Stannous octoate/EDA, grams (2/1 mole ratio) | — | — | 0.2 |

After 1 hour, Sample 1 had only faint ketone odor, while Samples (2) and (3) had significant ketone odor. After 3 hours, Sample (1) was still sticky, but Samples (2) and (3) had only slight surface tack. After 4 hours, Sample (1) was just beginning to cure, while Samples (2) and (3) exhibited through-cure in thicknesses up to about 2 mm. After 24 hours, Sample (1) was still sticky, while Samples (2) and (3) were tack free and cured through, with Sample (3) appearing to be more completely cured.

EXAMPLE 3

Effect of Amine Content; Demonstration of Adhesive Strength

Stannous octoate and ethylenediamine were mixed as in Example 1 but at mole ratios of 1:1 and 8:1 (instead of 2:1). These catalyst mixtures were used at 2% in the epoxy formulation of Example 1, applied as a 1×1×0.020-inch bond line between the ends of cleaned 4×1×0.032-inch cold rolled steel strips configured as a lap specimen. The bonds were exposed to 100% RH for 16 hours, then a 500 g weight was suspended from one end and the specimen hung in a 180° C. oven for 30 minutes. The bonds survived this test, indicating that they had moisture cured to provide green strength sufficient to hold during the heat cycle of a subsequent elevated temperature cure. Similar bonds containing 2% stannous octoate (without amine) failed this test after 16 hours, but passed after 24 hours at 100% RH. Bonds containing no catalyst failed after 24 hours, but passed after 32 hours at 100% RH.

EXAMPLE 4

Use of Alternative Epoxy Prepolymer

An epoxy resin was prepared by reacting 7 parts of a polyoxypropylene triamine (Jeffamine 403 available from Texaco Co.) with 50 parts of the diglycidyl ether of bisphenol A (EPON 828). To 9.18 parts of this resin was added 1.24 parts of the hexanediamine diisopropyl ketimine (used in Example 1), and 0.20 g of catalyst consisting of an 8/1 mole ratio of stannous octoate/ethylenediamine (used in Example 3). The mixture was placed in an inclined groove device varying in depth from 0–10 mm. After 17.5 hours at 100% RH, the cure had penetrated 2.4 millimeters.

EXAMPLE 5

Curing of an acrylate system with a triketimine.

A triketimine (designated TREN(DIPK)$_3$) was prepared by reaction of tris(aminoethyl)amine (TREN) with diisopropyl ketone. A polyether urethane triacrylate of equivalent weight 1660 (ANCAREZ 300A from Pacific Anchor Company) was formulated with pentaerythritol tetraacrylate (PETA), calcium carbonate, 8% TREN(DIPK)$_3$ and 2% stannous octoate/EDA (8/1 mole ratio) and placed in the inclined groove as in Example 4. After 9 hours at 100% RH the cure had penetrated 2.9 mm.

EXAMPLE 6

Curing of a Mixed Acrylate/Epoxy System

A mixture of 6.10 g polyether urethane triacrylate (ANCAREZ 300A), 0.06 g PETA, 1.38 g epoxy-functional amine (as prepared in Example 4), 1.22 g stearate-coated calcium carbonate, 0.32 g of 33% dicyandiamide in EPON 828, 0.92 g TREN(DIPK)$_3$ (Example 5) and 0.2 g of stannous octoate/EDA (1/1 mole ratio) was placed in the inclined groove as in Example 4, alongside a control recipe containing no tin catalyst. Cure penetrations in millimeters at various times at 100% RH were as follows:

|  | 2 hr | 4 hr | 6 hr | 10 hr |
|---|---|---|---|---|
| 2% Stannous octoate/EDA | 0.8 | 1.3 | 2.0 | 2.5 |
| Control | 0.0 | 0.0 | 0.5 | 1.2 |

EXAMPLE 7

Alternative Catalysts

The epoxy resin of Example 1 was formulated with 6% HDA(DIPK)$_2$ and 2% of the following catalysts:

|  | Mole Ratio |
|---|---|
| Stannous octoate/hexanediamine | 8/1 |
| Stannous octoate/polybutadiene diamine | 8/1 |

In inclined groove tests at 100% RH, the compositions cured significantly faster than a control containing no catalyst.

EXAMPLE 8

Amine/Stannous Octoate Adducts Containing Various Amines

The following amines were combined in a similar manner with stannous octoate, tested as hydrolysis catalysts, and found to be effective: m-phenylenediamine; tris(aminoethyl)amine; and piperazine.

EXAMPLE 9

Faster Catalyst Based on Amine/Water/Stannous Octoate Adduct

To a solution of 0.0457g (2.54 mmoles) water, plus 0.382 g (6.37 mmoles) ethylenediamine was added 2.53 g (6.25 mmoles) of stannous octoate (designated T-9) to give an exothermic reaction and a viscous yellow suspension, which was then heated at 80° C. for 8 hours. A mixture of 7.62 g of Ancarez 300A plus 0.08 g of pentaerythritol tetraacrylate plus 0.80 g of TREN(DIPK)$_3$ ketimine plus 1.50 g of stearate coated calcium carbonate plus 0.20 g of the EDA/H$_2$O/T-9 catalyst was prepared under dry conditions and placed in an inclined groove, along with two similar formulations that contained as catalyst 2% EDA/T-9 (1/8 mole ratio) or H$_2$O/T-9 (⅛ mole ratio). Upon exposure to 100% RH, depth of cure results (in mm) were as follows:

|  | mole ratio | 2 hrs | 4 hrs | 10.5 hrs | 15.5 hrs |
|---|---|---|---|---|---|
| EDA/H$_2$O/T-9 | 1/0.4/1 | 1.7 | 3.2 | 7.0 | 10.0 |
| EDA/T-9 | 1/8 | 1.5 | 2.9 | 4.0 | 5.0 |
| H$_2$O/T-9 | 1/1 | 1.4 | 2.8 | 3.8 | 4.9 |

EXAMPLE 10

Amine/Water/Stannous Octoate Adducts Containing Various Amines

Adducts with H$_2$O and stannous octoate were prepared with the following amines and shown to have activity as hydrolysis catalysts: ethylenediamine; m-phenylenediamine; 2-methylpentamethylenediamine; bisaminopropylpiperazine; diethylenetriamine; 3-(diethylamino)propylamine; piperazine; butylamine; dimethylaminoethanol; hexanediamine; dodecylamine; and triethylamine.

EXAMPLE 11

EDA/Water/Stannous Octoate Compositions and Concentrations

Catalysts with various ratios of EDA/H$_2$O/stannous octoate were prepared and tested, including the following mole ratios;
EDA/H$_2$O stannous octoate
0.5/0.5/1.0
0.7/0.3/1.0
0.8/0.2/1.0
1.0/0.4/1.0
1.0/1.0/1.0
1.0/3.0/1.0
2.0/2.0/1.0
3.0/1.0/1.0

The catalysts with EDA and H$_2$O contents of 1.0 or greater were the most effective. Catalyst concentrations of 2% by weight in the total formulation were typically used, but concentrations as low as 0.3% were still effective.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition comprising a latent amine curing agent and a catalyst for the moisture-induced hydrolysis of the agent, said catalyst comprising an amine-modified organotin compound formed from the reaction of a stannous alkanoate having from 2 to 20 carbon atoms and an amine-containing compound.

2. A composition according to claim 1, wherein the ratio of moles of stannous alkanoate to equivalents of amino groups in the amine-containing compound is from about 1:8 to about 8:1.

3. A composition according to claim 1, wherein the stannous alkanoate is stannous octoate.

4. A composition according to claim 1, wherein the amine-containing compound is a mono- or polyfunctional amine selected from the group consisting of ethylenediamine, triethylenetetraamine, diethylenetriamene, epoxy adducts of triethylenetetraamine, epoxy adducts of ethylenediamine, epoxy adducts of diethylenetriamine, 1,3-diaminopropane, 1,4-diaminobutane, hexanediamine, 4,9-dioxadodecane-1,12-diamine, 4,4'-diaminodicyclohexylmethane, 9-aminomethylstearylamine, polybutandiene diamine, m-phenylenediamine, tris(aminoethyl)amine, 2-methylpentamethylenediamine, bisaminopropylpiperazine, diethylenetriamine, 3-(diethylamino)propylamine, piperazine, butylamine, dimethylaminoethanol, dodecylamine, triethylamine, amineterminated polybutadiene, and mixtures thereof.

5. A composition according to claim 4, wherein the amine is ethylenediamine.

6. A composition according to claim 1, wherein the latent amine curing agent is a ketimine.

7. A composition according to claim 1, wherein the latent amine curing agent is an aldimine.

8. A composition according to claim 1, wherein the latent amine curing agent is an enamine.

9. A composition according to claim 1, wherein the latent amine curing agent is an oxazolidine.

* * * * *